Sept. 29, 1925.  
W. R. TWIFORD  
WINDMILL  
Filed March 3, 1924  
1,555,776  
3 Sheets-Sheet 1
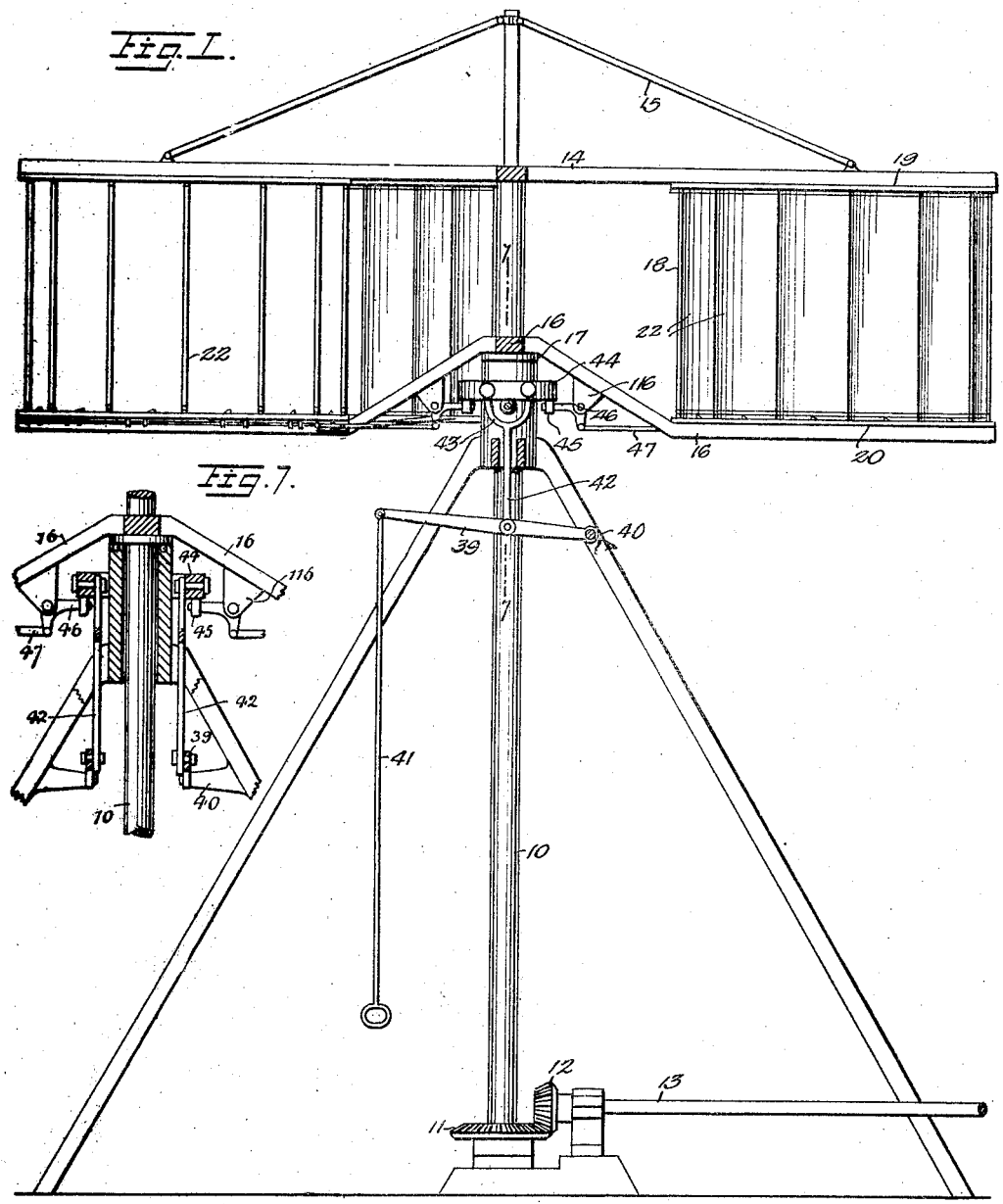
WITNESSES  
H. T. Walker  
J. L. McAuliffe
INVENTOR  
W. R. TWIFORD  
BY  
ATTORNEYS

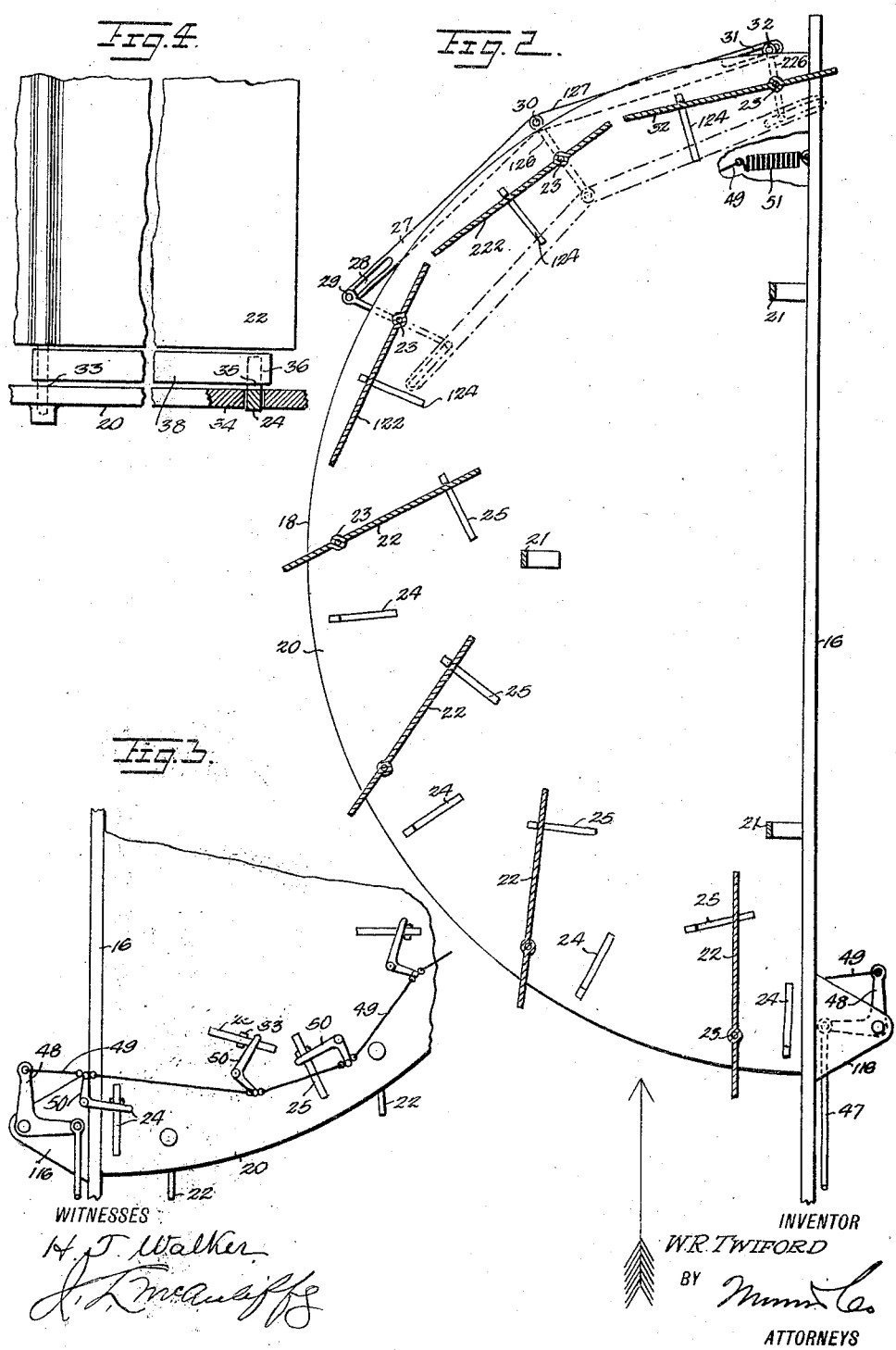

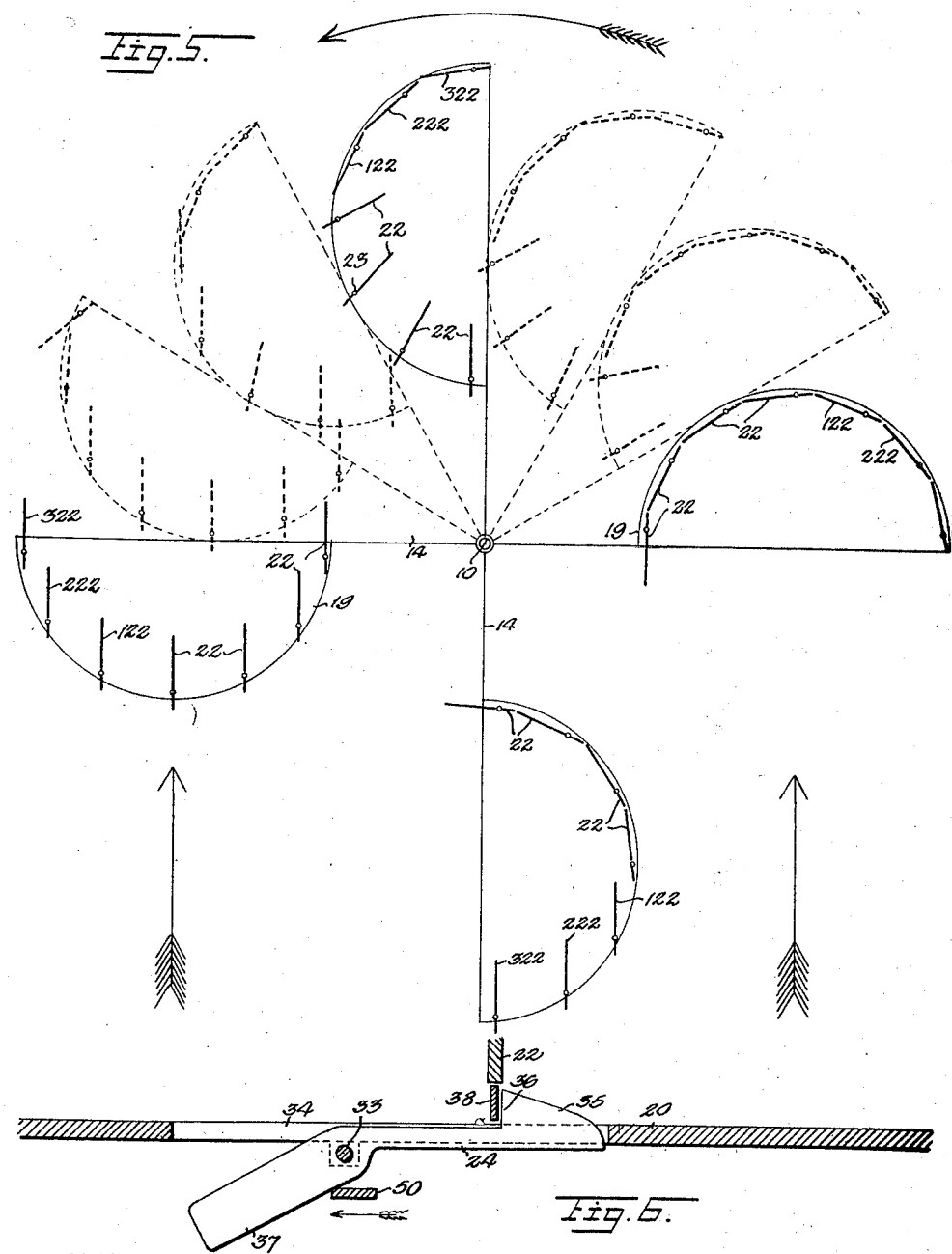

Patented Sept. 29, 1925.

1,555,776

UNITED STATES PATENT OFFICE.

WILLIAM RICHARD TWIFORD, OF MIAMI, FLORIDA.

WINDMILL.

Application filed March 3, 1924. Serial No. 696,586.

*To all whom it may concern:*

Be it known that I, WILLIAM R. TWIFORD, a citizen of the United States of America, and a resident of Miami, in the county of Dade and State of Florida, have invented a new and Improved Windmill, of which the following is a description.

My invention relates to wind mills and particularly to the type of wind mill in which a plurality of sails are mounted to have planetary movement about the axis of the mast of the wind mill and in which each sail is equipped with a series of blades that feather in moving against or into the wind at one side of the axis of the mast and dispose themselves in positions at the opposite side of the axis of the mast for taking the wind pressure.

The general object of my invention is to provide a wind mill of the indicated class in which the blades feather solely under the action of the wind without mechanical control by the elements of the wind wheel and which furthermore will alternately take the feathered positions and the wind receiving position without offering resistance to the turning of the wheel.

An important object also of the invention is to provide a planetary wind mill in which certain of the blades of each sail will receive the wind pressure for more than a half circle to thereby attain the maximum efficiency.

The means whereby the above and other objects as will appear are attained will be readily understood from the specific description following.

Reference is to be had to the accompanying drawings forming a part of this specification, it being understood that the drawings are merely illustrative of one example of the invention.

Figure 1 is a vertical section of a wind mill embodying my invention;

Figure 2 is a horizontal section through the blades of one of the sails;

Figure 3 is a fragmentary inverted plan view of one of the sails showing the means for tripping the blade stops;

Figure 4 is a fragmentary detail partly in elevation and partly in section given to show the cushioning spring associated with each blade for engaging the blade stop;

Figure 5 is a schematic plan view of the sails indicating the manner in which the blades feather;

Figure 6 is a detail in vertical section showing devices at the lower end of each sail;

Figure 7 is a detail in vertical section as indicated by the line 7—7, Figure 1.

In carrying out my invention in accordance with the illustrated example a mast 10 is mounted to turn and is braced by any approved means and transmits power through any suitable transmission devices such as a bevel pinion 11 engaging a bevel pinion 12 on power shaft 13. On top of the mast a frame for the sails is provided, said frame including cross top bars 14 and braces 15 extending from the top frame members to the upper end of shaft 110. The crossed bottom frame bars 16 extend obliquely upward to the mast at the central portions and are rigid with an enlargement 17 of the mast.

The arrangement is such that the sail frame may turn, with the power shaft, about the mast. Betweeen the top and bottom frame bars 14, 16 a plurality of sails designated generally by the numeral 18 is arranged, each sail comprising top plates 19 and bottom plates 20 each of said plates having outer edges in the arc of a circle.

Props 21 extend from the bottom plates 20 to the top plates 19 to give strength to the sail structure. Each sail is equipped with a plurality of blades 22 turning about vertical pivots 23 disposed nearer one edge of the blade than the other. The respective sails 18 with the frame members 14, 16, braces 15, and the blades of each sail, constitute a wheel turning about the axis of the mast 10.

The major number of the blades 22 are free to respond independently of one another in the movement of the blades against and with the wind in a manner so that each of said blades may feather independently of the others of said blades. Said major number of the blades (numbered 22) have associated therewith pairs of spaced stops 24, 25, to limit the blade movement. That blade 22 nearest the axis of the mast moves between its stops 24, 25. It will be observed that the stops 24, 25 of the next adjacent blade are spaced further apart than the first pair of stops 24, 25 and that the third pair of stops 24, 25 are spaced a slightly greater distance, the fourth pair of stops pertaining to the fourth blade 22 being spaced still further apart and the arc through which the blade swings is determined by the distance between the stops of the respective pairs.

In the preferred construction a group of the blades at the outer portion of each sail, there being three of said blades in the present instance, numbered 122, 222, 322, are connected and co-ordinated so that a movement of one will give an initial movement to an adjacent one to position the respective blades in the group to have no interference as the blades feather in succession. For the stated purpose the blade 122 has a crank arm 26 on the vertical pivot 23 thereof, said pivot being rigid with the blade. The next blade 222 has a shorter crank arm 126 on its pivot 23, and the outermost blade 322 has a still shorter crank arm 226 on its pivot 23. The crank arm 26 connects by a link 27 with the crank arm 126 and said arm 126 connects by a link 127 with the crank arm 226. A single stop 124 is provided for each of the blades 122, 222, and 322 to arrest the blade when it has moved to the wind resisting position. The crank arm 26 has a slot and pin connection with link 27, there being a slot 28 in said link through which passes a pivot pin 29 at the end of arm 26. Adjacent ends of the links 27, 127 have an unslotted connection being pivoted together by a pin 30 on the arm 126. The outermost end of the arm 27 or that end opposite the pivot 30 has a slot 31 receiving a pin 32 in the end of the crank arm 226. With the blades 122, 222, 322 thus connected through the medium of their crank arms and their links 27, 127, when the blade 122 moves against the wind and starts to feather by reason of receiving the wind pressure on the longer arm of the blade or that arm having the greatest dimension at one side of the pivot 23, said longer arm of said blade 122, will swing inward, thereby giving turning movement to the pivot 23 and crank arm 26, the result being that a pull will be exerted on the links 27, 127 and crank arm 126 will swing toward the blade 122, thereby turning the blade 222 to move the longer arm thereof inwardly so that the end of the longer arm of blade 122 will clear the blade 22. In the pull exerted on the links 27 and 127 the initial longitudinal movement of the link 127 will not affect the crank arm 226 owing to the slot and pin connection, 31, 32 but said link 127 will finally engage the pin 32 and swing the crank arm 226 toward the blade 222, thereby giving turning movement to the blade 322 so that blade 222 will have clearance to pass the end of blade 322. Hence, it will be seen that the blades 122, 222 and 322 will be caused to turn in sequence and will not interfere one with the other, notwithstanding that the three blades because of their positions at the outer end of the sail tend to swing almost simultaneously. The dotted lines in Figure 2 show the inner position of the links 27 and 127 after a complete turning movement of the blades 122, 222 and 322 from the positions against the stops 124 to the feathered position with the edges of the blade presented to the wind.

For throwing the wind mill out of operation the several stops 24, 25 and 124 are movably mounted and means is provided to trip said stops to take them out of the path of movement of the respective blades on the sails to permit the blades to all feather and swing to positions to present their edges to the wind, the construction and arrangement of parts for the purpose being as follows:

The stop (24) shown clearly in Figure 6 is secured to the bottom plate 20 by a transverse pivot 33 to have movement in a vertical plane through a slot 34 in the bottom 20. Each stop has a head 35 at one side of the pivot, said head presenting a laterally facing shoulder 36. The opposite end 37 of each stop constitutes a balance arm to maintain the stop with the head 35 projecting above the bottom 20 to lie in the path of movement of the particular sail blade 22. Instead of effecting unyielding contact between the stop shoulder 36 and the sail blade (22) I provide on the pivot 23 of each sail blade a plate spring 28 beneath the lower edge of the blade and in line to engage the shoulder 36 so that there is a cushioned impact between the blade and the stop. The head 35 is bevelled at the top from the end thereof to the shoulder 36 so that a blade after being freed by the lowering of a stop is shut off to turn the wheel out of operation, will automatically depress the stop as the blade returns to its normal position after the stops have been again raised to put the wheel in operation. In order to trip the several stops 24, 25, 124, 125 the following means is provided:

On one of the braces 110 of the upper bearing 310 provided for the mast 10, or on any other fixed part, a lever 39 is fulcrumed at one end as at 40, the opposite end having a pull rod 41 or equivalent device to exert a downward pull on said lever. To said lever between the fulcrum and free end is pivoted the lower end of a link 42, the upper end of which is forked in practice as at 43, the forked end being secured to a collar 44 slidable on the enlargement or collar 17 of mast 10. Said collar rests on rollers 45, said rollers being on one arm of a plurality of bellcrank levers 46 fulcrumed on lugs 116 on the frame elements 16. To the bellcrank levers 46 are connected push rods or links 47 which extend radially outward beneath each sail assemblage and each link 47 at that end opposite the bellcrank 45, is secured to a second bellcrank 48 rigid with frame bars 16 of a sail. From the other arm of the bellcrank 48 extends a pull wire 49 sections of which wire 49 or equivalent element connect a series of bellcranks 50 on the under side of the bottom 20. One arm of each bellcrank 50 extends beneath a stop (24, 25, 124) in a plane to engage the counter-balance arm 37 of a stop. Connection by the wire connections 49 between the bellcrank levers 50 causes all the levers 50 to be operated simultaneously for simultaneously tripping all the stops 24, 25 and 124, in a manner to cause the head 35 of each stop to move downwardly through the slot 34 out of the path of the contact spring 38 on the respective blades 22, thereby leaving the blades 22 free to respond to the pressure of the wind so that all may assume a feathered position edgewise to the wind to stop the turning of the wheel. The stops are all automatically restored to their normal positions for arresting the blades by a retractile spring 51 at the outer end of the outermost section of the wire 49.

It is to be noted that the pivots 23 of the blades of each sail are disposed on an arcuate line which in the preferred form of the invention is approximately in the arc of a circle. The result is that the blades when taking the wind are disposed in cup-shape. The arrangement serves to make the wind pressure available to the maximum extent when all the blades are presented to the wind and the major portion of the blades are disposed in positions to receive the wind pressure for more than a half circle and some of the blades, for example, those numbered 122, 222 and 322 receiving wind pressure for materially more than half circle, whereby the maximum efficiency in the wheel is attained. It will be noticed also that by reason of the absence of a mechanical control and feathering of the blades by the wheel mechanism, the blades in feathering offer no resistance and throw no load on the wheel.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a wind mill, a wind wheel comprising a plurality of sails mounted to rotate about the axis of the wheel, each sail embodying a series of blades turnable about separate vertical axes, and stops associated with the respective blades and serving to limit the turning movement thereof; together with means to move the stops out of the paths of the blades to permit unrestricted turning of the blades for throwing the wind mill out of action.

2. In a wind mill, a wind wheel having sails mounted to rotate about the axis of the wheel, a plurality of blades on each sail and turnable about vertical pivots subject to the wind pressure at the opposite sides of the axis of the wheel, stops pivoted to have vertical movement and adapted to assume positions to limit the movements of the blades, and manually operable means to remove said stops from the paths of movement of the blades.

3. In a wind mill, a wind wheel having sails mounted to rotate about the axis of the wheel, a plurality of blades on each sail and turnable about vertical pivots subject to the wind pressure at the opposite sides of the axis of the wheel, stops pivoted to have vertical movement and adapted to assume positions to limit the movements of the blades, and manually operable means to remove said stops from the paths of movements of the blades; together with yielding members turning with the blades and positioned to receive the impact due to the engagement with the stops.

4. In a wind mill, a wind wheel comprising a plurality of sails mounted to rotate about the axis of the wheel, a plurality of blades embodied in each sail and turnable about vertical pivots, and stops for said blades including a pair of stops for each of the blades in the group nearest the axis of the wheel, the stops of each pair associated with the blades of said group being spaced increasing distances toward the outer end of the sail.

5. In a wind mill, a wind wheel comprising a plurality of sails mounted to rotate about the axis of the wheel, a plurality of blades embodied in each sail and turnable about vertical pivots, and stops for said blades including a pair of stops for each of the blades in the group nearest the axis of the wheel, the stops of each pair associated with the blades of said group being spaced increasing distances toward the outer end of the sail; together with a single stop for each of those blades disposed outward of said group.

6. In a wind mill, a wind wheel comprising a plurality of sails mounted to rotate about the axis of the wheel, a plurality of blades embodied in each sail and turnable about vertical pivots, and stops for said blades including a pair of stops for each of the blades in the group nearest the axis of the wheel, the stops of each pair associated with the blades of said group being spaced increasing distances toward the outer end of the sail; together with a single stop for each of those blades disposed outward of said group, and manually operable means to throw all of said stops simultaneously out of the paths of said blades.

7. In a wind mill, a wind wheel comprising a plurality of sails mounted to rotate about the axis of the wheel, a plurality of blades embodied in each sail and each turnable about its separate vertical pivot, rockable stops for the respective blades, connections between the several stops, and manually operable means to remove all the stops simultaneously out of the paths of the blades.

8. In a wind mill, a wind wheel comprising a plurality of sails mounted to rotate about the axis of the wheel, a plurality of blades embodied in each sail and turnable about vertical axes, a mast about which said wheel may turn, a vertically slidable collar on said mast, manually operable means to slide said collar, bellcrank levers adapted to be engaged by said collar in its downward movement, and operative means between said levers and said stops to simultaneously move all the stops out of the paths of the blades by the operation of said levers.

9. In a wind mill, a wind wheel having sails mounted to rotate about the axis of the wheel, said sails having a plurality of blades, each blade mounted to have turning movement about its separate axis to enter edgewise into the wind and to be disposed in a plane transverse to the wind for receiving the wind pressure, certain of said blades being linked together so that the turning movement of the one will be imparted to another.

10. In a wind mill, a wind wheel having sails mounted to rotate about the axis of the wheel, said sails having a plurality of blades, each blade mounted to have turning movement about its separate axis to enter edgewise into the wind and to be disposed in a plane transverse to the wind for receiving the wind pressure, crank arms rigid with certain of said blades to partake of the turning movement thereof, and links connecting the said crank arms of adjacent blades.

11. In a wind mill, a wind wheel having sails mounted to rotate about the axis of the wheel, said sails having a plurality of blades, each blade mounted to have turning movement about its separate axis to enter edgewise into the wind and to be disposed in a plane transverse to the wind for receiving the wind pressure, crank arms rigid with certain of said blades to partake of the turning movement thereof, and links connecting the said crank arms of adjacent blades, the ends of the end links having a slot and pin connection with the adjacent crank arms.

12. In a wind mill, a wind wheel having sails mounted to rotate about the axis of the wheel, said sails having a plurality of blades, each blade mounted to have turning movement about its separate axis to enter edgewise into the wind and to be disposed in a plane transverse to the wind for receiving the wind pressure, certain of said blades being linked together so that the turning movement of the one will be imparted to another; together with a single stop member disposed in the path of turning of said linked blades.

13. In a wind mill, a wind wheel comprising a plurality of sails mounted to rotate about the axis of the wheel, each sail having a plurality of blades, each blade mounted to turn about its own axis to feather in a movement against the wind and to assume a position transverse to the wind when taking the wind pressure, the pivots of said blades disposed on an arcuate line.

14. In a wind mill, a wind wheel comprising a plurality of sails mounted to rotate about the axis of the wheel, each sail having a plurality of blades, each blade mounted to turn about its own axis to feather in a movement against the wind and to assume a position transverse to the wind when taking the wind pressure, the pivots of said blades disposed on an arcuate line; together with stops to limit turning movements of said blades, and means to cause withdrawal of the stops from the paths of the blades to permit the blades unrestricted turning movement under the wind pressure.

15. In a wind mill, a wind wheel comprising a plurality of sails mounted to rotate about the axis of the wheel, each sail having a plurality of blades, each blade mounted to turn about its own axis to feather in a movement against the wind and to assume a position transverse to the wind when taking the wind pressure, said blades each presenting longer arms at one side of the pivot than at the opposite side.

16. In a wind mill, a wind wheel comprising a plurality of sails mounted to rotate about the axis of the wheel, each sail having a plurality of blades, each blade mounted to turn about its own axis to feather in a movement against the wind and to assume a position transverse to the wind when taking the wind pressure, the pivots of said blades disposed on an arcuate line, a plurality of those blades at the outer end of said arcuate line being linked together so that the turning movement of one will be imparted to an adjacent blade outward thereof when the blades move against the wind.

WILLIAM RICHARD TWIFORD.